(12) United States Patent
Krafzig et al.

(10) Patent No.: US 9,002,551 B2
(45) Date of Patent: Apr. 7, 2015

(54) METHOD AND DEVICE FOR OPERATING A HYBRID VEHICLE AND COMPUTER PROGRAM PRODUCT AND VEHICLE

(75) Inventors: Benjamin Krafzig, Lehre (DE); Norbert Weiβ, Sickte (DE); Vasoontara Thiamtong, Wolfsburg (DE); Kai Philipp, Groβ Schwülper (DE)

(73) Assignee: Volkswagen AG, Wolfsburg (DE)

(*) Notice: Subject to any disclaimer, the term of this patent is extended or adjusted under 35 U.S.C. 154(b) by 723 days.

(21) Appl. No.: 12/976,801

(22) Filed: Dec. 22, 2010

(65) Prior Publication Data

US 2011/0153130 A1    Jun. 23, 2011

(30) Foreign Application Priority Data

Dec. 22, 2009  (DE) .......................... 10 2009 059 974
Oct. 14, 2010  (DE) .......................... 10 2010 048 548

(51) Int. Cl.
| | |
|---|---|
| *B60K 1/00* | (2006.01) |
| *B60W 10/06* | (2006.01) |
| *B60W 10/08* | (2006.01) |
| *B60W 20/00* | (2006.01) |
| *B60W 30/188* | (2012.01) |

(52) U.S. Cl.
CPC .......... *B60W 10/06* (2013.01); *B60L 2240/423* (2013.01); *B60L 2240/443* (2013.01); *B60W 10/08* (2013.01); *B60W 20/102* (2013.01); *B60W 30/1882* (2013.01); *B60W 2510/0657* (2013.01); *B60W 2510/083* (2013.01); *Y02T 10/6286* (2013.01); *Y02T 10/642* (2013.01); *B60L 2200/26* (2013.01)

(58) Field of Classification Search
USPC ............. 701/22, 54; 180/65.1, 65.25, 65.265, 180/65.285, 65.29, 65.31
See application file for complete search history.

(56) References Cited

U.S. PATENT DOCUMENTS

| | | | |
|---|---|---|---|
| 5,327,992 A | 7/1994 | Boll | |
| 5,788,004 A | 8/1998 | Friedmann et al. | |
| 7,104,347 B2 * | 9/2006 | Severinsky et al. | ........ 180/65.23 |
| 7,134,516 B2 * | 11/2006 | Eisenhardt et al. | ...... 180/65.235 |

FOREIGN PATENT DOCUMENTS

| | | |
|---|---|---|
| DE | 42 17 668 | 5/1993 |
| DE | 43 44 053 | 7/1994 |
| DE | 195 05 431 | 8/1996 |
| DE | 10 2004 062 938 | 7/2006 |
| DE | 10 2007 028 700 | 1/2009 |

* cited by examiner

*Primary Examiner* — Adam Tissot
(74) *Attorney, Agent, or Firm* — Pearl Cohen Zedek Latzer Baratz LLP

(57) ABSTRACT

A hybrid vehicle includes a combustion engine, an electric motor, and a drive train that is optionally connectible to the electric motor or the combustion engine. An operating mode of the hybrid vehicle is determined automatically as a function of a setpoint torque and an operating state of the hybrid vehicle, the operating mode specifying whether the combustion engine, the electric motor, or the combustion engine and the electric motor is/are used as the drive mechanism of the hybrid vehicle. The operating mode is determined at least such that an efficiency of the drive train including the drive mechanism selected in accordance with the determined operating mode is at a maximum. Depending on the determined operating mode, the combustion engine and/or the electric motor is/are coupled automatically to the drive train for operating the hybrid vehicle.

9 Claims, 2 Drawing Sheets

METHOD AND DEVICE FOR OPERATING A HYBRID VEHICLE AND COMPUTER PROGRAM PRODUCT AND VEHICLE

CROSS-REFERENCE TO RELATED APPLICATIONS

The present application claims priority to Application No. 10 2009 059 974.6, filed in the Federal Republic of Germany on Dec. 22, 2009, and to Application No. 10 2010 048 548.9, filed in the Federal Republic of Germany on Oct. 14, 2010, each of which is expressly incorporated herein in its entirety by reference thereto.

FIELD OF THE INVENTION

The present invention relates to a method and a device for operating a hybrid vehicle. In addition, the present invention relates to a corresponding computer program product and an accordingly configured vehicle.

BACKGROUND INFORMATION

U.S. Pat. No. 7,104,347 describes a hybrid vehicle, which processes a fuel economically and has low exhaust gas emissions.

According to certain conventional systems, control systems for hybrid vehicles are provided, in which only the position of the accelerator pedal is evaluated as a torque request in order to select an operating mode of the hybrid vehicle. In such a control system, the hybrid vehicle is consequently driven by the electric machine or the electric motor in a lower load range, and above this load range the internal combustion machine or the combustion engine of the hybrid vehicle is added or the hybrid vehicle is driven solely by the latter. In this control system, a switchover point defined exclusively by the torque is thus specified, which is always included as a reference point in calculations of the control system. Therefore, in this control system, for example, the combustion engine is always operated above this switchover point, and a battery of the hybrid vehicle is charged by the surplus energy produced by this combustion engine.

Due to the rigid switchover point, which depends solely on the torque request, the fuel consumption is not optimized in conventional hybrid vehicles.

SUMMARY

Example embodiments of the present invention provide a hybrid vehicle in which the fuel consumption of the hybrid vehicle is as optimized as possible.

In example embodiments of the present invention, a method for operating a hybrid vehicle is provided. The hybrid vehicle includes a combustion engine, an electric motor, and a drive train. For driving the hybrid vehicle, the drive train is coupled to the combustion engine and/or to the electric motor. An operating mode of the hybrid vehicle is automatically determined as a function of a setpoint torque, which may be specified for example by a position of an accelerator pedal of the hybrid vehicle, and as a function of an operating state of the hybrid vehicle. For this purpose, the operating mode specifies whether solely the combustion engine, solely the electric motor, or the combustion engine and the electric motor is/are to be used as the drive mechanism of the hybrid vehicle. The choice of operating mode is made such that an efficiency of the drive train including the drive mechanism selected in accordance with the determined operating mode is at a maximum. Depending on the determined operating mode, the combustion engine and/or the electric motor is/are automatically coupled to the drive train in order to drive the hybrid vehicle. The drive train includes, for example, the transmission, the clutch and the drive shafts.

According to example embodiments of the present invention, no fixed switchover point is ascertained, at which the hybrid vehicle is also or solely operated by the combustion engine. The operating mode may be selected as a function of the operating state of the vehicle such that the total efficiency of the drive train including the selected drive mechanism at an optimum, which then results in a minimal fuel consumption. The total efficiency includes the sum of the efficiencies of those elements of the drive train including the drive mechanism, which drive the hybrid vehicle when the corresponding operating mode is selected. These are for example, in addition to the efficiency of the transmission (friction of the transmission) and the efficiency of the wheels of the hybrid vehicle (speed-dependent rolling resistance), the efficiency of the combustion engine, the efficiency of the battery, or the efficiency of the electric motor. The efficiency of the combustion engine and of the electric motor on the one hand depends on the setpoint torque and on the other hand on the rotational speed, as will be explained with reference to FIG. 1. For this purpose, it must be taken into account that the electric motor and the combustion engine are normally coupled to the same crankshaft such that the rotational speed of the electric motor corresponds to the rotational speed of the combustion engine. The efficiency of the battery depends on its state of charge. In addition, the efficiency of the battery also depends on the magnitude of the electrical current flowing in it or from it. The higher this current, the warmer the battery will become and the lower will be its efficiency.

The efficiency is calculated by a ratio of an energy or power provided by the respective element per unit of time and an energy or power supplied for this purpose to the respective element per unit of time. The energy supplied to the combustion engine for example corresponds to a corresponding fuel quantity consumed by the combustion engine and thus to a chemical energy. The (mechanical) energy provided by the combustion engine may be determined according to a, e.g., conventional, torque model, it being additionally necessary to take into account the air quantity supplied to the combustion engine. The electric motor may be used as a generator in order to convert mechanical energy into electrical energy, or as a motor in order to convert electrical energy into mechanical energy. For this purpose, the mechanical energy may be determined via a voltage and a current, which may be measured respectively in the pulse-controlled inverter of the electric motor. The pulse-controlled inverter is used in particular to convert a direct voltage provided by the battery for driving the electric motor into an alternating voltage or to convert an alternating voltage generated by the electric motor (=generator) into a direct voltage. The electrical energy may be determined via a charge quantity, which is either supplied by the battery (electric motor operates as a motor) or is supplied to the battery (electric motor operates as a generator), in both cases a charge quantity having to be subtracted, with which the electrical system of the vehicle is supplied.

According to example embodiments of the present invention, on the one hand, an available electrical energy is used with an optimum efficiency (i.e., the hybrid vehicle is operated by the electric motor only when this is optimal from the perspective of efficiency) and, on the other hand, the combustion engine is operated at operating points having an optimum efficiency such that there results a minimal fuel consumption for the hybrid vehicle.

In order to select the operating mode that is optimized with respect to the efficiency as a function of the operating state of the hybrid vehicle, one or more characteristic data fields may be used. These characteristic data fields indicate for numerous operating states of the hybrid vehicle the particular operating mode that is optimized with respect to the total efficiency. These characteristic data fields may be established for example by tests of the hybrid vehicle or by corresponding simulations.

In example embodiments of the present invention, a first torque limit value is determined as a function of the operating state of the hybrid vehicle. If the setpoint torque is lower than or equal to this torque limit value, then, solely the electric motor is used as a drive mechanism. If the setpoint torque is greater than the first torque limit value, then either only the combustion engine or the electric motor and the combustion engine are used to drive the hybrid vehicle.

Since the combustion engine would have to be operated at an unfavorable efficiency in order to output a low torque, it is practical to implement the drive of the hybrid vehicle using only the electric motor at a setpoint torque below a specified first torque limit value.

In addition, it is possible to determine a second torque limit value as a function of the operating state of the hybrid vehicle. If the setpoint torque is greater than this second torque limit value, both the combustion engine as well as the electric motor are used to drive the hybrid vehicle.

By using the electric motor and the combustion engine for driving the hybrid vehicle, the hybrid vehicle may be driven with a torque that cannot be provided by the combustion engine alone.

The optimal operating mode is determined not only by the setpoint torque, but also by the operating state of the hybrid vehicle, the operating state being influenced or determined by one or by more of the following parameters:

1. The state of charge of the battery of the hybrid vehicle.
    The higher the state of charge of the battery, the greater is the tendency to drive the hybrid vehicle using the electric motor, or the smaller is the advantage of charging energy generated by the combustion engine into the battery.
2. The temperature of the battery.
    At a very low temperature of the battery (e.g., <5° C.), the current flow into or our of the battery should not exceed a specified threshold value.
3. The friction of the combustion engine.
    The friction of the combustion engine decisively determines the efficiency of the combustion engine.
4. The temperature of the combustion engine.
    For thermodynamic reasons, the combustion engine should not be stopped if the temperature of the combustion engine is below another specified threshold value (e.g., 50° C.), which means that an automatic start-stop system of the hybrid vehicle for example is not used in this temperature range.
5. The friction of the drive train.
    The friction of the drive train decisively determines the efficiency of the drive train.
6. The temperature of the drive train.
    The temperature of the drive train affects the friction of the drive train and thus the efficiency of the drive train.
7. An energy requirement of the electrical system of the hybrid vehicle.
    The electrical system comprises all electrical devices (e.g. air conditioning system, radio, electrical heating system) of the vehicle. The higher the energy requirement of the electrical system, the sooner the combustion engine will be used as the drive mechanism of the hybrid vehicle.
8. Rotational speed.
    The efficiencies of the drive train, the electric motor, and the combustion engine depend on the rotational speed.
9. The driving speed of the hybrid vehicle.
    This parameter optionally may be used for a readily reproducible driving behavior of the hybrid vehicle.

The above-mentioned parameters affect in particular the first limit value, which is permanently calculated anew as a function of the aforementioned parameters.

When the hybrid vehicle is operated in the operating mode in which the combustion engine is used as the drive mechanism, then the rotational speed of the combustion engine is set, in particular, such that the efficiency of the drive train including the combustion engine is at a maximum. An excess torque, which results from the corresponding setting of the combustion engine, is used to charge the battery in that the electric motor is operated as a generator.

In other words, the combustion engine is operated in a range of the optimum efficiency, in which the combustion engine normally produces a torque that is above the setpoint torque. This difference between the torque of the combustion engine and the setpoint torque is taken up by the electric motor, which is operated as a generator, and an electrical current is generated by the difference, by which the battery is charged.

A computer program product is also provided, in particular a software, which may be loaded into a memory of a programmable control unit of the hybrid vehicle. Using this computer program product, all or various of the above-described features may be implemented when the computer program product is running on the control unit. For this purpose, the computer program product possibly requires, e.g. libraries and auxiliary functions in order to implement the respective features. The software may be a source code (e.g., in C++), which still needs to be compiled and linked or which only needs to be interpreted, or an executable software code, which for execution only needs to be loaded into the respective computing unit.

The program code of the computer program product may be constructed in a modular manner such that in a first software module of the program code the operating mode is determined as a function of influence parameters (e.g., of the first and the second limit value), while in a second software module of the program code the influence parameters themselves are determined (for example the first and the second limit value are calculated).

Taking the influence parameters into account is thus structurally separated from the actual selection of the operating mode. This has the advantage that on the one hand a reproducible operating mode selection may be made and that on the other hand the multitude of different influence parameters, which result for example from different configurations of the drive train of the hybrid vehicle, may be compensated universally.

Because of the modular structure, only the respective software modules and not the entire software or the entire program code have to be changed in the case of an adaptation to a new vehicle or in the case of an exchange of the battery.

In addition, a device for operating a hybrid vehicle is also provided. The device includes a control system for controlling the hybrid vehicle, while the hybrid vehicle includes a combustion engine, an electric motor, and a drive train. The control system may determine the above-described operating mode of the hybrid vehicle as a function of a setpoint torque and an operating state of the hybrid vehicle. Depending on the determined operating mode, the control system may couple the drive train for driving the hybrid vehicle to the combustion engine, to the electric motor, or to the combustion engine and the electric motor.

According to example embodiments of the present invention, a vehicle include may include any of the foregoing features.

It should be noted that example embodiments of the present invention may be used to operate a hybrid vehicle that has multiple electric motors.

While the systems and methods described herein may be particularly suited for operating a hybrid vehicle, they may also be used in ships, airplanes or rail-bound vehicles that include a combustion engine and an electric motor.

According to an example embodiment of the present invention, a method for operating a hybrid vehicle, the hybrid vehicle including a combustion engine, an electric motor, and a drive train that is selectively connectible to the electric motor or the combustion engine, includes: as a function of a setpoint torque and an operating state of the hybrid vehicle, automatically determining an operating mode of the hybrid vehicle, the operating mode specifying whether (a) the combustion engine, (b) the electric motor, or (c) the combustion engine and the electric motor is used as a drive mechanism of the hybrid vehicle, the operating mode being determined at least such that an efficiency of the drive train including the drive mechanism selected in accordance with the determined operating mode is at a maximum; and depending on the determined operating mode, automatically coupling at least one of (a) the combustion engine and (b) the electric motor to the drive train to operate the hybrid vehicle.

The operating mode may be determined as a function of the operating state of the hybrid vehicle such that the efficiency is at a maximum based on at least one characteristic data field, in which as a function of operating states of the hybrid vehicle respectively the operating mode having a best efficiency is stored.

The method may include: determining a first torque limit value as a function of the operating state of the hybrid vehicle; using only the electric motor as the drive mechanism when a setpoint torque is less than or equal to the first torque limit value; and using at least the combustion engine as the drive mechanism when the setpoint torque is higher than the first torque limit value.

The method may include: determining a second torque limit value as a function of the operating state of the hybrid vehicle; and using the combustion engine and the electric motor as the drive mechanism when the setpoint torque is higher than the second torque limit value.

The operating state of the hybrid vehicle may depend on at least one of the following parameters: a state of charge of a battery of the hybrid vehicle; a temperature of the battery; a friction of the combustion engine; a temperature of the combustion engine; a friction of the drive train; a temperature of the drive train; an energy requirement of an electrical system of the hybrid vehicle; and a driving speed of the hybrid vehicle.

The method may include: in the operating mode in which the combustion engine is used as the drive mechanism, setting a rotational speed of the combustion engine such that the efficiency of the drive train including the combustion engine is at a maximum; and using a surplus torque, which results from a torque produced by the combustion engine minus a setpoint torque, by operation of the electric motor as a generator to charge a battery.

According to an example embodiment of the present invention, a non-transitory computer-readable storage medium includes an executable program stored thereon, wherein the program instructs a microprocessor to perform a method for operating a hybrid vehicle, the hybrid vehicle including a combustion engine, an electric motor, and a drive train that is selectively connectible to the electric motor or the combustion engine, including: as a function of a setpoint torque and an operating state of the hybrid vehicle, automatically determining an operating mode of the hybrid vehicle, the operating mode specifying whether (a) the combustion engine, (b) the electric motor, or (c) the combustion engine and the electric motor is used as a drive mechanism of the hybrid vehicle, the operating mode being determined at least such that an efficiency of the drive train including the drive mechanism selected in accordance with the determined operating mode is at a maximum; and depending on the determined operating mode, automatically coupling at least one of (a) the combustion engine and (b) the electric motor to the drive train to operate the hybrid vehicle.

The storage medium may be arranged as a memory of a control unit of the hybrid vehicle and the control unit may include the microprocessor.

The storage medium may be arranged in a modular manner, such that the operating mode is determined in a first module as a function of influence parameters, and the influence parameters may be determined in at least one second module.

According to an example embodiment of the present invention, a system includes: a control device adapted to control a hybrid vehicle, the hybrid vehicle including a combustion engine, an electric motor, and a drive train. The control device is adapted to determine an operating mode of the hybrid vehicle as a function of a setpoint torque and an operating state of the hybrid vehicle, the operating mode specifying whether (a) the combustion engine, (b) the electric motor, or (c) the combustion engine and the electric motor are used as a drive mechanism of the hybrid vehicle, the control device adapted to determine the operating mode such that an efficiency of the drive train including the drive mechanism selected in accordance with the determined operating mode is at a maximum. The control device is adapted to couple the drive train automatically to at least one of (a) the combustion engine and (b) the electric motor as a function of the determined operating mode for driving the hybrid vehicle.

The system may be adapted to perform a method including: as a function of a setpoint torque and an operating state of the hybrid vehicle, automatically determining an operating mode of the hybrid vehicle, the operating mode specifying whether (a) the combustion engine, (b) the electric motor, or (c) the combustion engine and the electric motor is used as a drive mechanism of the hybrid vehicle, the operating mode being determined at least such that an efficiency of the drive train including the drive mechanism selected in accordance with the determined operating mode is at a maximum; and depending on the determined operating mode, automatically coupling at least one of (a) the combustion engine and (b) the electric motor to the drive train to operate the hybrid vehicle.

According to an example embodiment of the present invention, a vehicle includes: a system including a control device adapted to control a hybrid vehicle, the hybrid vehicle including a combustion engine, an electric motor, and a drive train. The control device is adapted to determine an operating mode of the hybrid vehicle as a function of a setpoint torque and an operating state of the hybrid vehicle, the operating mode specifying whether (a) the combustion engine, (b) the electric motor, or (c) the combustion engine and the electric motor are used as a drive mechanism of the hybrid vehicle, the control device adapted to determine the operating mode such that an efficiency of the drive train including the drive mechanism selected in accordance with the determined operating mode is at a maximum. The control device is adapted to couple the drive train automatically to at least one of (a) the combustion engine and (b) the electric motor as a function of the determined operating mode for driving the hybrid vehicle.

Further features and aspects of example embodiments of the present invention are described in more detail below with reference to the appended Figures.

DETAILED DESCRIPTION

Figure 1:
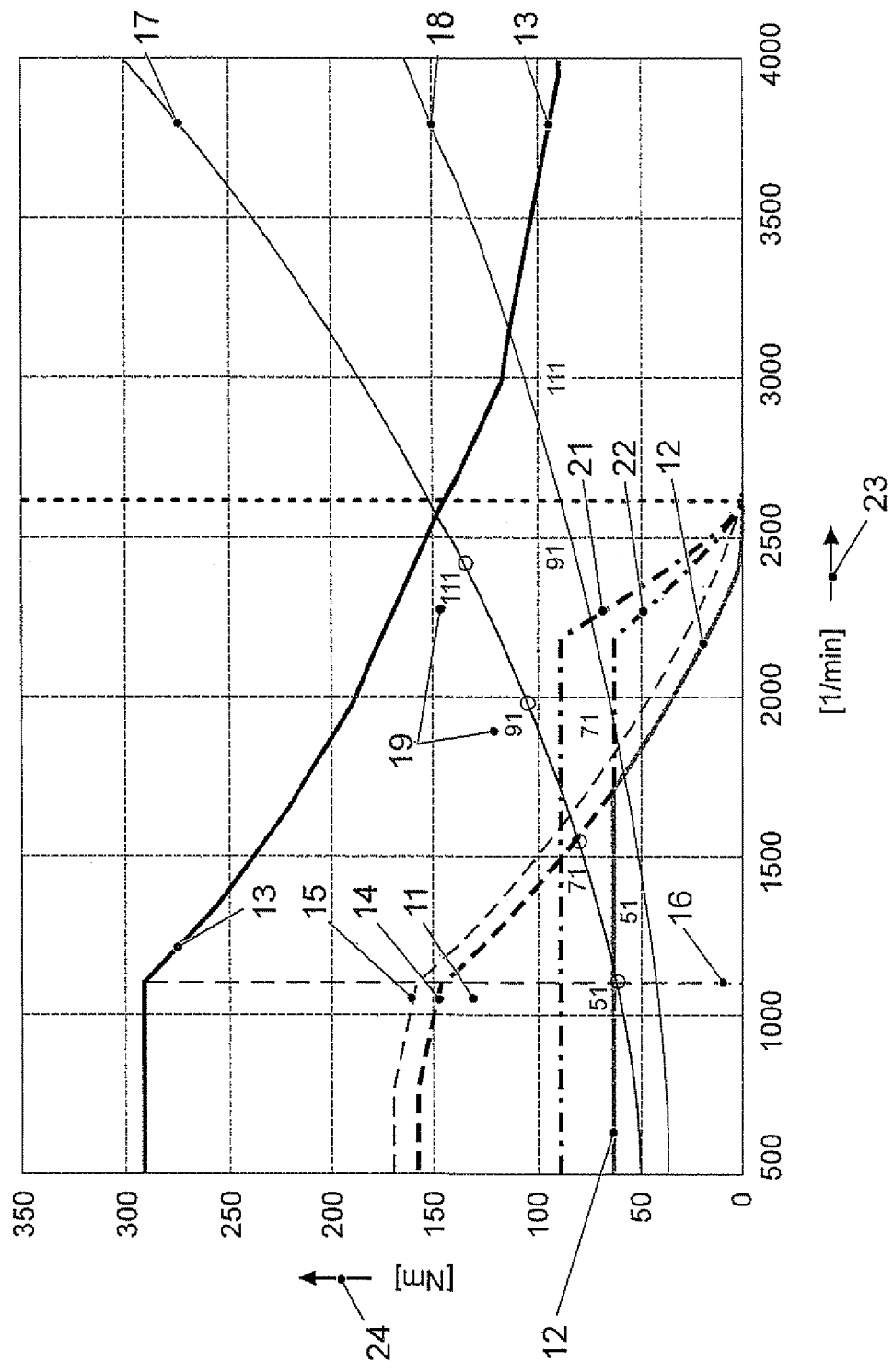
FIG. 1 shows specific curves and ranges of the rotational speed of the hybrid vehicle plotted against the torque.

FIG. 1 shows a torque 24, which is output by a drive of the hybrid vehicle as a function of a rotational speed 23 of the crankshaft, plotted against this rotational speed. Reference numerals 17 and 18 respectively show a road resistance line of the combustion engine for the sixth and fifth gear of the combustion engine over rotational speed 23, a road resistance line representing the torque required for driving.

Reference numeral 13 shows a full load curve of the electric motor, which represents the maximum power to be output by the electric motor over rotational speed 23. It may be seen that up to a certain rotational speed or bend rotational speed 16, the maximum torque supplied by the electric motor is independent of rotational speed 23.

Reference numerals 14 and 15 respectively denote a torque limit curve, which indicates up to the third gear or starting with the fourth gear a torque dependent on rotational speed 23, which the electric motor is able to supply for a restart of the combustion engine, taking into account a reserve torque. The torque reserve for restarting the combustion engine is understood as a torque that is to be supplied by the electric motor in order to start the combustion engine in such a way that a driver of the hybrid vehicle does not notice it. If the hybrid vehicle were driven for example solely by the electric motor at a rotational speed of 1000 with 250 Nm, the reserve torque of approximately 40 Nm (distance from full load curve 13), which would then still be available, would be too low for restarting the combustion engine such that restarting the combustion engine would result in a noticeable jerking of the hybrid vehicle since the missing torque would have to be obtained from the kinetic energy of the vehicle.

A region 11 below limit curve 14 and 15 describes a dynamic electric driving range, in which the hybrid vehicle is driven solely by the electric motor depending on the torque reserve for restarting the combustion engine and in which in particular it remains for less than 10 seconds (bounce time). In this region 11, for example, recuperated energy is used specifically if the state of charge of the battery is above a specified threshold value. The hybrid vehicle possibly remains longer in this region 11, if this is desired explicitly by the driver of the hybrid vehicle, in that the driver has pressed for example a corresponding electric driving button of the hybrid vehicle. A corresponding driver request is fulfilled even when, taking into account the efficiency, at least an addition of the combustion engine would be advantageous.

For a high state of charge and for a low state of charge of the battery, reference numerals 21 and 22 respectively describe a limit curve for a range in which the hybrid vehicle is to be driven only by the electric motor based on consumption considerations. A high state of charge exists if the battery for example is charged more than 60% or if the battery has a first specified amount of charge. A low state of charge exists if the battery for example is charged less than 50%, but has at least a second specified amount of charge. Limit curves 21, 22 do not take into account a reserve torque for restarting the combustion engine. Curve 12 by contrast describes a range limit for a range in which the hybrid vehicle should be driven solely by the electric motor based on consumption considerations by taking into account the reserve torque for restarting the combustion engine. Curve 12 thus describes the course of the first torque limit value explained above, below which the hybrid vehicle is preferably to be operated solely by the electric motor.

The numbers 19 indicated with respect to road resistance lines 17 and 18 represent a speed of the hybrid vehicle for the respective gear (fifth or sixth) for the respective rotational speed.

Figure 2:
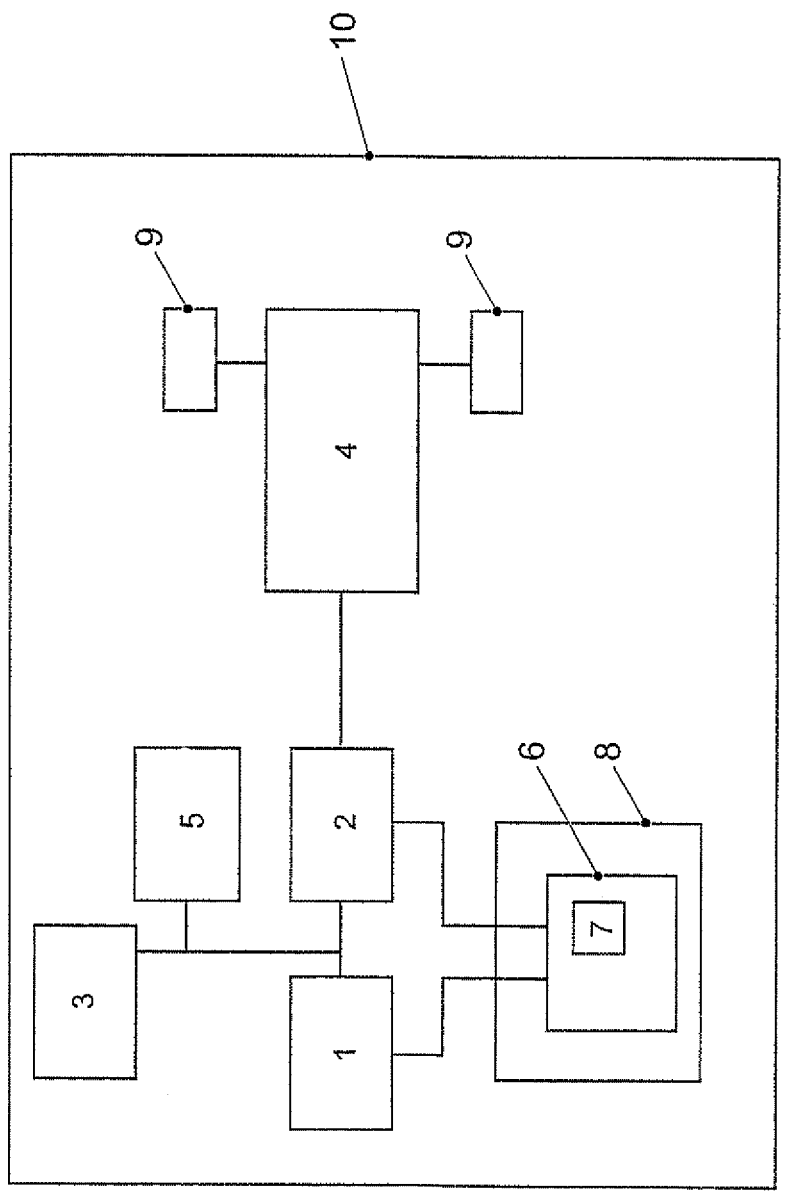
FIG. 2 schematically shows a vehicle according to an example embodiment of the present invention.

FIG. 2 schematically shows a hybrid vehicle 10 according to an example embodiment of the present invention. Hybrid vehicle 10 includes a drive train 4, by which wheels 9 of hybrid vehicle 10 are driven. Furthermore, hybrid vehicle 10 includes a combustion engine 1 and an electric motor 2, which is connected to a battery 3 of hybrid vehicle 10. Depending on a device 8 for operating a hybrid vehicle 10, which is likewise a component of hybrid vehicle 10, combustion engine 1 and/or electric motor 2 is/are coupled to drive train 4 for driving hybrid vehicle 10. In addition to electric motor 2, battery 3 also supplies an electrical system 5 of hybrid vehicle 10. Device 8 includes a control system 6, which includes a memory 7 for storing characteristics maps. With the aid of the characteristics maps, control device 6 decides, as a function of an operating state of hybrid vehicle 10, whether combustion engine 1, electric motor 2, or combustion engine 1 and electric motor 2 are coupled to drive train 4.

What is claimed is:

1. A method for operating a hybrid vehicle, the hybrid vehicle comprising a combustion engine, an electric motor, a drive train selectively coupled to the electric motor or the combustion engine, and a control device, the method comprising the following steps, wherein said steps are performed by said control device:

automatically determining an operating mode of the hybrid vehicle, the operating mode specifying whether (a) the combustion engine, (b) the electric motor, or (c) the combustion engine and the electric motor is selected as a drive mechanism of the hybrid vehicle, wherein the operating mode is determined as a function of a setpoint torque and an operating state of the hybrid vehicle, and being selected at least such that the drive train, including the selected drive mechanism, is operating at a maximum efficiency based on at least one characteristic data field of the operating state of the hybrid vehicle, wherein the operating state is dependent upon at least one parameter selected from the group consisting of a state of charge of a battery of the hybrid vehicle, a temperature of the battery, a friction of the combustion engine, a temperature of the combustion engine, a friction of the drive train, a temperature of the drive train, an energy requirement of an electrical system of the hybrid vehicle, and a driving speed of the hybrid vehicle;

automatically coupling at least one of (a) the combustion engine and (b) the electric motor to the drive train to operate the hybrid vehicle depending on the determined operating mode;

determining a first torque limit value and a second torque limit value, each as a function of the operating state of the hybrid vehicle;

using only the electric motor as the drive mechanism when a setpoint torque is less than or equal to the first torque limit value;

using at least the combustion engine as the drive mechanism when the setpoint torque is higher than the first torque limit value; and using the combustion engine and the electric motor as the drive mechanism when the setpoint torque is higher than the second torque limit value.

2. The method according to claim 1, wherein the operating mode in which the drive train is operating at a maximum efficiency is stored.

3. The method according to claim 1, further comprising:

in the operating mode in which the combustion engine is used as the drive mechanism, setting a rotational speed of the combustion engine such that the efficiency of the drive train including the combustion engine is at the maximum; and using a surplus torque, which results from a torque produced by the combustion engine minus a setpoint torque, by operation of the electric motor as a generator to charge a battery.

4. A non-transitory computer-readable storage medium with an executable program stored thereon, wherein the program instructs a microprocessor to perform a method for operating a hybrid vehicle, the hybrid vehicle comprising a combustion engine, an electric motor, and a drive train that is selectively coupled to the electric motor or the combustion engine, the method comprising:

automatically determining an operating mode of the hybrid vehicle, the operating mode specifying whether (a) the combustion engine, (b) the electric motor, or (c) the combustion engine and the electric motor is selected as a drive mechanism of the hybrid vehicle, wherein the operating mode is determined as a function of a setpoint torque and an operating state of the hybrid vehicle at least such that the drive train, including the selected drive mechanism, is operating at a maximum efficiency based on at least one characteristic data field of the operating state of the hybrid vehicle, wherein the operating state is dependent upon at least one parameter selected from the group consisting of a state of charge of a battery of the hybrid vehicle, a temperature of the battery, a friction of the combustion engine, a temperature of the combustion engine, a friction of the drive train, a temperature of the drive train, an energy requirement of an electrical system of the hybrid vehicle, and a driving speed of the hybrid vehicle;

automatically coupling at least one of (a) the combustion engine and (b) the electric motor to the drive train to operate the hybrid vehicle depending on the determined operating mode;

determining a first torque limit value and a second torque limit value, each as a function of the operating state of the hybrid vehicle;

using only the electric motor as the drive mechanism when a setpoint torque is less than or equal to the first torque limit value;

using at least the combustion engine as the drive mechanism when the setpoint torque is higher than the first torque limit value; and using the combustion engine and the electric motor as the drive mechanism when the setpoint torque is higher than the second torque limit value.

5. The non-transitory computer-readable storage medium according to claim 4, wherein the storage medium is arranged as a memory of a control unit of the hybrid vehicle and the control unit includes the microprocessor.

6. The non-transitory computer-readable storage medium according to claim 4, wherein the storage medium is arranged in a modular manner, such that the operating mode is determined in a first module as a function of influence parameters, and the influence parameters are determined in at least one second module.

7. A system, comprising: a control device adapted to control a hybrid vehicle, the hybrid vehicle comprising a combustion engine, an electric motor, and a drive train;

wherein the control device is adapted to determine an operating mode of the hybrid vehicle as a function of a setpoint torque and an operating state of the hybrid vehicle, the operating mode specifying whether (a) the combustion engine, (b) the electric motor, or (c) the combustion engine and the electric motor is selected as a drive mechanism of the hybrid vehicle, wherein the control device is adapted to determine the operating mode such that the drive train, including the selected drive mechanism, is operating at a maximum efficiency based on at least one characteristic data field of the operating state of the hybrid vehicle, wherein the operating state is dependent upon at least one parameter selected from the group consisting of a state of charge of a battery of the hybrid vehicle, a temperature of the battery, a friction of the combustion engine, a temperature of the combustion engine, a friction of the drive train, a temperature of the drive train, an energy requirement of an electrical system of the hybrid vehicle, and a driving speed of the hybrid vehicle;

wherein the control device is adapted to automatically couple the drive train to at least one of (a) the combustion engine and (b) the electric motor as a function of the determined operating mode for driving the hybrid vehicle;

wherein the control device is adapted to determine a first torque limit value and a second torque limit value, each as a function of the operating state of the hybrid vehicle;

wherein the control device is adapted to use only the electric motor as the drive mechanism when a setpoint torque is less than or equal to the first torque limit value;

wherein the control device is adapted to use at least the combustion engine as the drive mechanism when the setpoint torque is higher than the first torque limit value; and wherein the control device is adapted to use the combustion engine and the electric motor as the drive mechanism when the setpoint torque is higher than the second torque limit value.

8. The system according to claim 7, wherein the system is adapted to perform a method including:

automatically determining an operating mode of the hybrid vehicle, the operating mode specifying whether (a) the combustion engine, (b) the electric motor, or (c) the combustion engine and the electric motor is selected as a drive mechanism of the hybrid vehicle, the operating mode being determined as a function of a setpoint torque and an operating state of the hybrid vehicle, and being selected at least such that the drive train, including the selected drive mechanism, is operating at a maximum efficiency;

automatically coupling at least one of (a) the combustion engine and (b) the electric motor to the drive train to operate the hybrid vehicle depending on the determined operating mode.

9. A vehicle, comprising:

a system including a control device adapted to control a hybrid vehicle, the hybrid vehicle comprising a combustion engine, an electric motor, and a drive train;

wherein the control device is adapted to determine an operating mode of the hybrid vehicle, the operating mode specifying whether (a) the combustion engine, (b) the electric motor, or (c) the combustion engine and the electric motor is selected as a drive mechanism of the hybrid vehicle, wherein the control device is adapted to determine the operating mode as a function of a setpoint torque and an operating state of the hybrid vehicle, and select the operating mode such that the drive train, including the selected drive mechanism, is operating at a maximum efficiency based on at least one characteristic data field of the operating state of the hybrid vehicle, wherein the operating state is dependent upon at least one parameter selected from the group consisting of a state of charge of a battery of the hybrid vehicle, a temperature of the battery, a friction of the combustion engine, a temperature of the combustion engine, a friction of the drive train, a temperature of the drive train, an energy requirement of an electrical system of the hybrid vehicle, and a driving speed of the hybrid vehicle;

wherein the control device is adapted to couple the drive train automatically to at least one of (a) the combustion engine and (b) the electric motor as a function of the determined operating mode for driving the hybrid vehicle;

wherein the control device is adapted to determine a first torque limit value and a second torque limit value, each as a function of the operating state of the hybrid vehicle;

wherein the control device is adapted to use only the electric motor as the drive mechanism when a setpoint torque is less than or equal to the first torque limit value;

wherein the control device is adapted to use at least the combustion engine as the drive mechanism when the setpoint torque is higher than the first torque limit value; and wherein the control device is adapted to use the combustion engine and the electric motor as the drive mechanism when the setpoint torque is higher than the second torque limit value.

* * * * *